(12) United States Patent
Miyazaki

(10) Patent No.: US 7,239,348 B2
(45) Date of Patent: Jul. 3, 2007

(54) DIGITAL CAMERA WITH A MUSIC PLAYBACK FUNCTION

(75) Inventor: Takao Miyazaki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 730 days.

(21) Appl. No.: 09/866,685

(22) Filed: May 30, 2001

(65) Prior Publication Data

US 2002/0033889 A1    Mar. 21, 2002

(30) Foreign Application Priority Data

May 30, 2000    (JP)    ............................ 2000-160036

(51) Int. Cl.
*H04N 5/76* (2006.01)
*H04N 5/222* (2006.01)

(52) U.S. Cl. ............................ 348/231.4; 348/333.02; 386/52

(58) Field of Classification Search ............ 348/231.4, 348/333.01, 333.02, 333.05, 423.1, 333.12, 348/375, 376; 386/96, 107, 117, 121, 32, 386/52.59, 55; 84/600, 645; 396/312; 360/32; 715/723

See application file for complete search history.

(56) References Cited

U.S. PATENT DOCUMENTS

| | | | |
|---|---|---|---|
| 5,159,140 A * | 10/1992 | Kimpara et al. ............... 84/600 |
| 5,521,663 A * | 5/1996 | Norris, III .................... 396/312 |
| 5,767,845 A * | 6/1998 | Oashi et al. ............. 715/500.1 |
| 5,812,736 A * | 9/1998 | Anderson ..................... 386/96 |
| 5,890,116 A * | 3/1999 | Itoh et al. .................... 704/260 |
| 6,084,169 A * | 7/2000 | Hasegawa et al. ............ 84/600 |
| 6,317,141 B1 * | 11/2001 | Pavley et al. ................ 345/732 |
| 6,587,119 B1 * | 7/2003 | Anderson et al. ........... 345/672 |
| 6,687,382 B2 * | 2/2004 | Nagahara et al. ........... 382/100 |
| 2001/0016113 A1 * | 8/2001 | Ejima et al. .................. 386/96 |

FOREIGN PATENT DOCUMENTS

JP    09322044 A  * 12/1997

* cited by examiner

*Primary Examiner*—Lin Ye
(74) *Attorney, Agent, or Firm*—Birch, Stewart, Kolasch & Birch, LLP.

(57) ABSTRACT

A digital camera, which includes: an image playback module; and a music playback module, wherein a plurality of images are played back accompanied by music, an image playback time for the plurality of images substantially coincides with a music playback time for the music, and the image playback time is defined based on a number of the images and a playback time for each of the images, when sequentially playing back the plurality of images.

43 Claims, 18 Drawing Sheets

SWITCHING OF IMAGES SYNCRONIZED WITH SUB-SECTIONS OF MUSIC

O : SWITCHING OF IMAGES

△ : SEGMENTATION OF SUB-SECTIONS

"SPIN DOOR"

"SLIDE"

"BOX"

DIGITAL CAMERA WITH A MUSIC PLAYBACK FUNCTION

This patent application claims priority from a Japanese patent application No. 2000-160036 filed on May 30, 2000, the contents of which are incorporated herein by reference.

BACKGROUND OF THE INVENTION

1. Field of the Invention

The present invention relates to a digital camera. More particularly, the present invention relates to a digital camera capable of playing back both music and images.

2. Description of the Related Art

As digital cameras have become widely used in modern times, functions of digital cameras have correspondingly improved. As one of various functions of digital cameras, the function of record and playback music is proposed.

If a digital camera sequentially plays back several images, the digital camera may provide a slide show of the images. Moreover, if the digital camera also plays back music along with the images, the digital camera may provide a more attractive slide show in the effect of the acoustics provided by the music playback. One example is to play back music as background music while sequentially playing back scenery pictures.

However, ordinal digital cameras cannot simultaneously play back music, which is separately prepared, along with the playback of images. Even if a digital camera could play back music as background music along with the playback of pictures that a user wants to see, the time needed for playing back pictures selected by the user and the time needed for playing back music selected by the user are usually different. If the time for playing back pictures is longer than that of music, the playback of music ends first and only the pictures are continually played back. On the other hand, if the time for playing back music is longer than that of pictures, only the music is played back without the pictures being played back. Therefore, a user cannot get expected acoustic effects by merely selecting pictures and music.

SUMMARY OF THE INVENTION

Therefore, it is an object of the present invention to provide a digital camera with a music playback function, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a digital camera, which includes: an image playback module; and a music playback module, wherein a plurality of images are played back accompanied by music, an image playback time for the plurality of images substantially coincides with a music playback time for the music, and the image playback time is defined based on a number of the images and a playback time for each of the images, when sequentially playing back the plurality of images.

The digital camera may further include: an image setting section for selecting the images; and a music setting section for selecting the music, wherein an image playback time is adjusted to make the image playback time and the music playback time substantially coincide, based on the number of the images and the music playback time of the music.

The digital camera may further include: an image playback time-setting section for setting the playback time of each of the images; and a music setting section for selecting the music, wherein the number of the images may be adjusted to make the image playback time and the music playback time substantially coincide, based on the playback time of each of the images and the music playback time of the music.

The digital camera may further include: an image setting section for setting the number of the images; and an image playback time-setting section for setting the playback time of each of the images, wherein the music, which is adjusted so that the image playback time and the music playback time substantially coincide, may be edited, based on the number of the images and the playback time of each of the images.

The digital camera may further include an adjustment section for adjusting the image playback time to substantially coincide with the music playback time, when the image playback time and the music playback time are not substantially the same.

The adjustment section may include an image playback time-adjusting section for adjusting the image playback time; the image playback time-adjusting section includes: an image number-adjusting section for setting the number of the images; and an image time-adjusting section for setting the playback time of each of the images, wherein the image playback time-adjusting section may adjust the image playback time to substantially coincide with the music playback time, based on the image number-adjusting section and the image time-adjusting section.

The adjustment section may include a music playback time-adjusting section for adjusting the music playback time; and the music playback time-adjusting section may adjust the music playback time to substantially coincide with the image playback time.

The digital camera may further include: a playback time setting section for setting a time defined by a user as playback time of the images; an image playback time-adjusting section for adjusting the image playback time to substantially coincide with the playback time defined by the user; and a music playback time-adjusting section for adjusting the music playback time to substantially coincide with the playback time defined by the user.

An image file may be created having the music playback time and the image playback time that substantially coincide.

The digital camera may further include: a movie playback module, wherein movies may be played back having movie playback time that substantially coincides with the music playback time of the music, the music being separate from the movies and played back to accompany the movies.

The digital camera may further include a screen switching-setting section for setting the playback time of each of the images by synchronizing timing for switching images with a specific timing of the music.

The specific timing of the music my be at least one of a beginning of each sub-section of the music and a distinctive sound.

The digital camera may further include an image processing section for setting a process of image switching for each genre of the music.

The digital camera may further include: a movie playback module, wherein movies and the images may be played back such that a total playback time for playing back the plurality of images along with the movies substantially coincides with the music playback time, and the music may be separate from the movies and may be played back to accompany the movies and the images.

Creation information of at least one of the images and the movies may be outputted to a file.

According to the second aspect of the present invention, a method for adjusting an image playback time of a plurality of images and a music playback time of accompanying music to substantially coincide, the method which includes: (a) accepting input of instructions for selecting images and music to be played back; (b) setting at least one of images to be played back, an image playback time for playing back the images, music to be played back, movies to be played back, a total playback time, a music genre, a screen switching method, and a mixing level; (c) obtaining at least one of the image playback time and the music playback time from the setting of the images and the setting of the music; (d) adjusting at least one of the obtained image playback time and the obtained music playback time; and (e) processing at least one of the images and the music after the adjusting of at least one of the obtained image playback time and the obtained music playback time.

According to the third aspect of the present invention, an image and music playback apparatus for playing back images accompanied by music, which includes: an image playback module; a music playback module; and an images editing section connected to the image playback module and the music playback module, the images editing section correlating an image playback time, which is a time for playing back images, and a music playback time, which is a time for playing back accompanying music.

The image editing section may include: an adjustment section having at least one of: an image number-adjusting section for adjusting a number of images to be played back; and an image time-adjusting section for adjusting a time for playing back an image.

The image and music playback apparatus may further include: an image processing section connected to the adjustment section, the image processing section processing the images in concert with the music to be played back; and a music processing section connected to the adjustment section, the music processing section processing the music in concert with the images to be played back.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
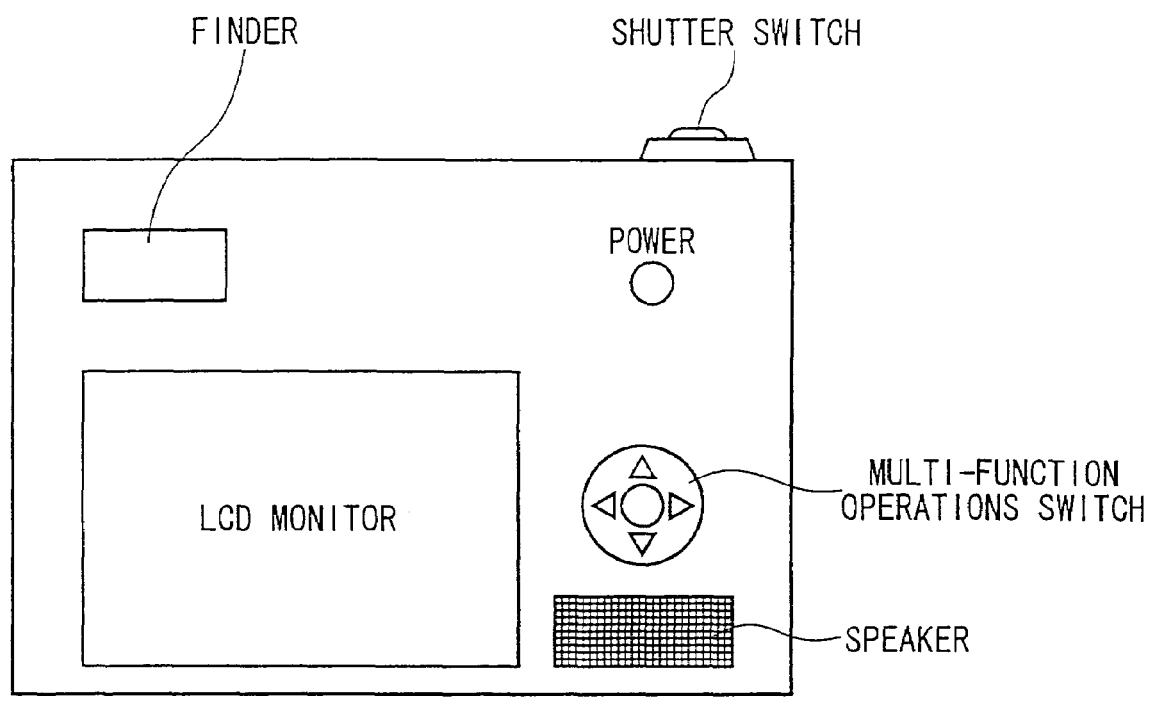
FIG. 1 illustrates a diagram showing the exterior of a digital camera according to an embodiment of the present invention.

FIG. 1 illustrates a diagram showing the exterior of a digital camera according to an embodiment of the present invention. FIG. 1 shows the opposite side of the lens of the digital camera. On this side, there are an LCD monitor for displaying images and various information, a multi-function operations switch for operating the camera based on information displayed on the LCD monitor, and a speaker for outputting sounds, as well as a power switch and a finder of the camera. Moreover, a microphone, which is not shown in the drawings, may record voices. The digital camera displays images on the LCD monitor as well as outputting voices and the like from the speaker.

Figure 2:
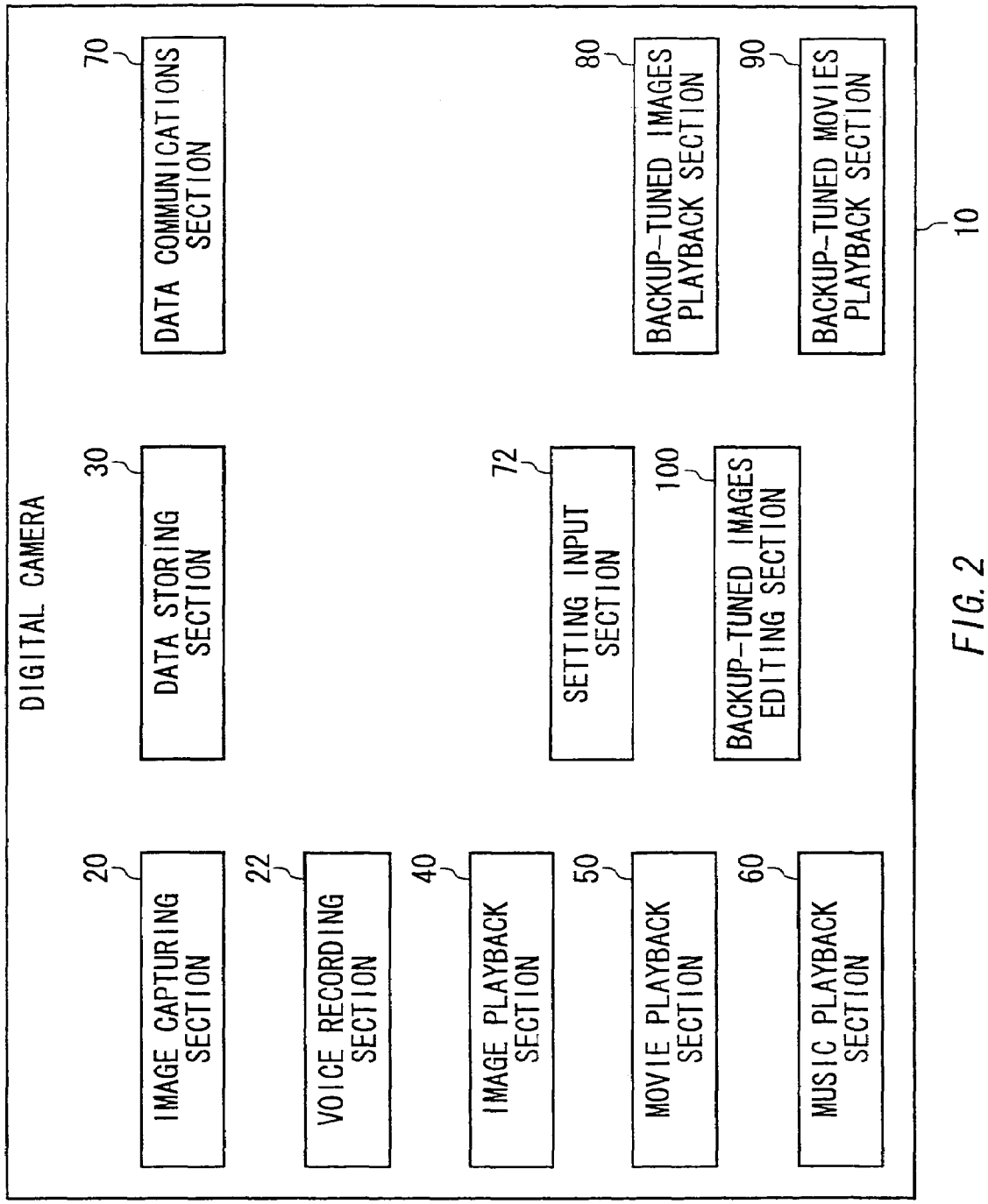
FIG. 2 is a structural diagram of the digital camera 10 according to an embodiment of the present invention.

FIG. 2 is a structural diagram of the digital camera 10 according to an embodiment of the present invention. The digital camera 10 includes an image capturing section 20, a voice recording section 22, a data storing section 30, an image playback section 40, a movie playback section 50, a music playback section 60, a data communications section 70, a setting input section 72, a backup-tuned images playback section 80, a backup-tuned movies playback section 90, and a backup-tuned images editing section 100.

The image capturing section 20 includes structural and electric members needed for photographing and imaging, such as a CCD. The digital camera 10 according to the present embodiment is capable of photographing images and movies by the image capturing section 20.

The data storing section 30 records data, such as photographed images. The data storing section 30 writes image data in an external storage device, such as a non-volatile memory, a volatile memory, or a memory card of the digital camera 10.

The voice recording section 22 collects voices with a microphone and the like. The voice recording section 22 then records the collected voices in a memory by superimposing on movie data.

The image playback section 40 and the movie playback section 50 read the image data and the movie data written by the data storing section 30 from a memory and so forth. The LCD monitor of the digital camera 10 then plays back the read image data and the movie data. The music playback section 60 outputs music data in a memory and voices included in movie data, via a speaker and so forth.

The digital camera 10 is capable of playing back music by the music playback section 60. The music playback section 60 includes structural and electrical members for playing back music and voices. For example, a speaker or headphones may output music and sounds.

The data communications section 70 may transfer recorded data to an electronic appliance, such as a personal computer, which is outside of the digital camera 10. The data communications section 70 includes electrical members necessary for communication. The data communications section 70 controls, for example, conversions of protocols according to communications specifications, such as USB, RS-232C, Ethernet, and Bluetooth.

The backup-tuned images playback section 80 may play back voice data, such as music prepared separately from images, as well as playing back images. The images that are played back along with music, in another words, images accompanied by music, are referred to as "backup-tuned images" hereinafter. An example of playing back backup-tuned images is to play back a slide show, which sequentially displays images along with playing back music as background music that matches with the displaying images.

On the other hand, the backup-tuned movies playback section 90 may play back voice data, such as music prepared separately from movies, as well as playing back movies. The movies that are played back along with music are called backup-tuned movies. An example of playing back backup-tuned movies is to play back a photographed movie along with playing back music as background music.

The digital camera 10 accepts various settings from the user through a setting input section 72, which includes a multi-function switch having across key and so forth. The settings to be accepted include, for example, a selection of images for playing back, a setting of playback time for each image, a selection of movies for playing back, a setting of playback time for each movie, a selection of music for playing back, a setting of playback time for music, and a setting of mixing level for voices.

The backup-tuned images editing section 100 edits backup-tuned images (slide shows) based on the images and music as materials. The backup-tuned images editing section 100 adjusts the playback time of images and music, which are included in backup-tuned images, according to need. The backup-tuned images editing section 100 then creates backup-tuned images whose image playback time needed for playing back images coincides with a music playback time needed for playing back music. In the case of backup-tuned movies, the backup-tuned images editing section 100 creates backup-tuned movies whose movie playback time coincides with the music playback time.

The backup-tuned images editing section 100 may create backup-tuned mixed images whose playback time of combination of slide show part of images and movies coincides with the music playback time. The details of the backup-tuned images editing section 100 are described later.

Here, the relationship among images, movies, and music, which are included in backup-tuned images are played back at the digital camera 10 according to the present embodiment.

Figure 3:
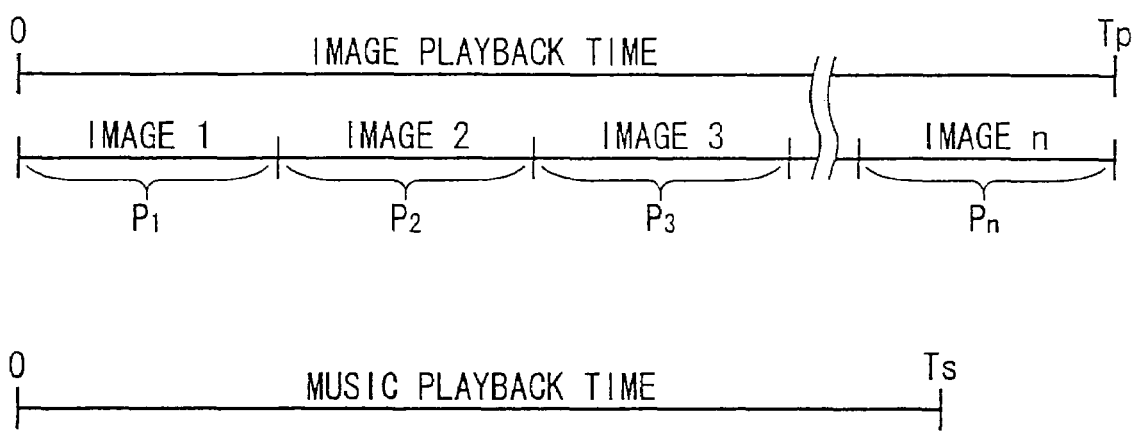
FIG. 3 is a diagram showing a relationship between an image playback time and a music playback time for playing back backup-tuned images.

FIG. 3 is a diagram showing a relationship between the image playback time and the music playback time for playing back backup-tuned images. With respect to playing back images, each of the previously selected images (referred to as "image" hereinafter) are sequentially played back. In this case, if it supposed that Tp represents the image playback time and TS represents the music playback time, the calculation of Tp is undertaken in the following manner. If the number of images that are sequentially played back is n, Tp is calculated as Tp=P1+P2+P3+ . . . Pn. Here, Pi(I=1~n) represents an image playback time needed for playing back each image. On the other hand, the music playback time is Ts. Since Tp and Ts usually do not coincide with each other, the digital camera 10 according to the present embodiment plays back music along with images by adjusting the image playback time Pi, the number of images n, and the music playback time Ts by the backup-tuned images editing section 100 so that Tp and Ts coincide with each other. Thus, the image playback time of images included in backup-tuned images coincides with the music playback time of music included in backup-tuned images. Therefore, the image playback time and the music playback time become the playback time of backup-tuned images.

Figure 4:
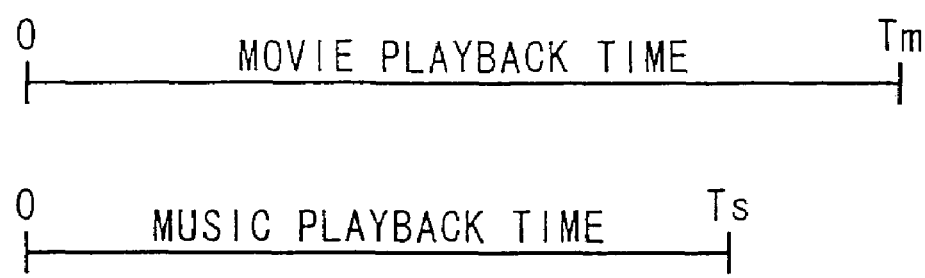
FIG. 4 is a diagram showing a relationship between a movie playback time and a music playback time for playing back backup-tuned movies.

FIG. 4 is a diagram showing a relationship between the movie playback time and the music playback time for playing back backup-tuned movies. The music and movies played back in backup-tuned movies are data separately or originally prepared, respectively. Therefore, since the music playback time usually does not coincide with the movie playback time, adjustments of the playback time are made by the adjustments of the music playback time described above. For playing back movies, the music playback time Ts of the music played back along with movies is adjusted by the backup-tuned images editing section 100 based on a movie playback time Tm required for playing back the movies, and the music is played back along with the movies. Thus, in the last result, the movie playback time of the movies included in the backup-tuned movies coincides with the music playback time of music included in the backup-tuned images, thereby the movie playback time and the music playback time become the playback time of the backup-tuned movies.

Figure 5:
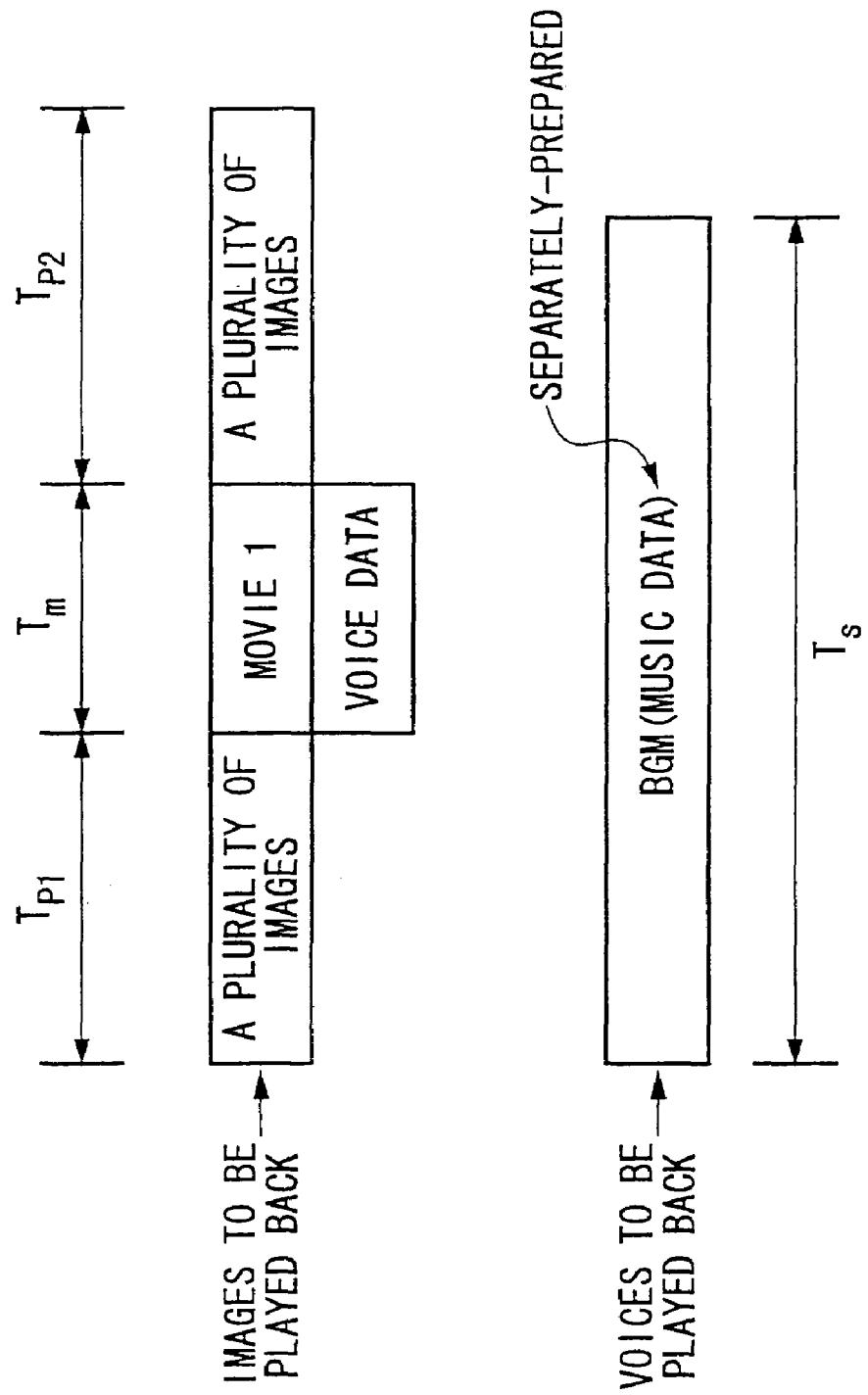
FIG. 5 is a diagram showing a relationship between an image and movie playback time and a music playback time for playing back backup-tuned mixed images of both still and moving pictures.

FIG. 5 is a diagram showing a relationship between the image and movie playback time and the music playback time for playing back backup-tuned mixed images of both still and moving pictures. Here, the mixed images are a combination of a slide show part of images and movies. The backup-tuned mixed images play back music prepared separately from the mixed images, along with the mixed images.

The music that is played in the backup-tuned mixed images and the mixed images are data prepared separately from or originally to the mixed images. Here, the total playback time including both the image playback time and the movie playback time is referred to as a "mixed image playback time" hereinafter. Therefore, since the music playback time and the mixed image playback time do not coincide with each other, music is played back along with the mixed images after the above-described adjustment of, for example, the music playback time and the image playback time are made.

Thus, in the last result, the playback time of the mixed images included in the backup-tuned mixed images coincides with the playback time of the music included in the backup-tuned mixed images. Therefore, the mixed image playback time and the music playback time become the playback time of the backup-tuned mixed images. In this case also, a backup-tuned mixed image file may also be made in the same way as the backup-tuned images or the backup-tuned movies.

Figure 6:
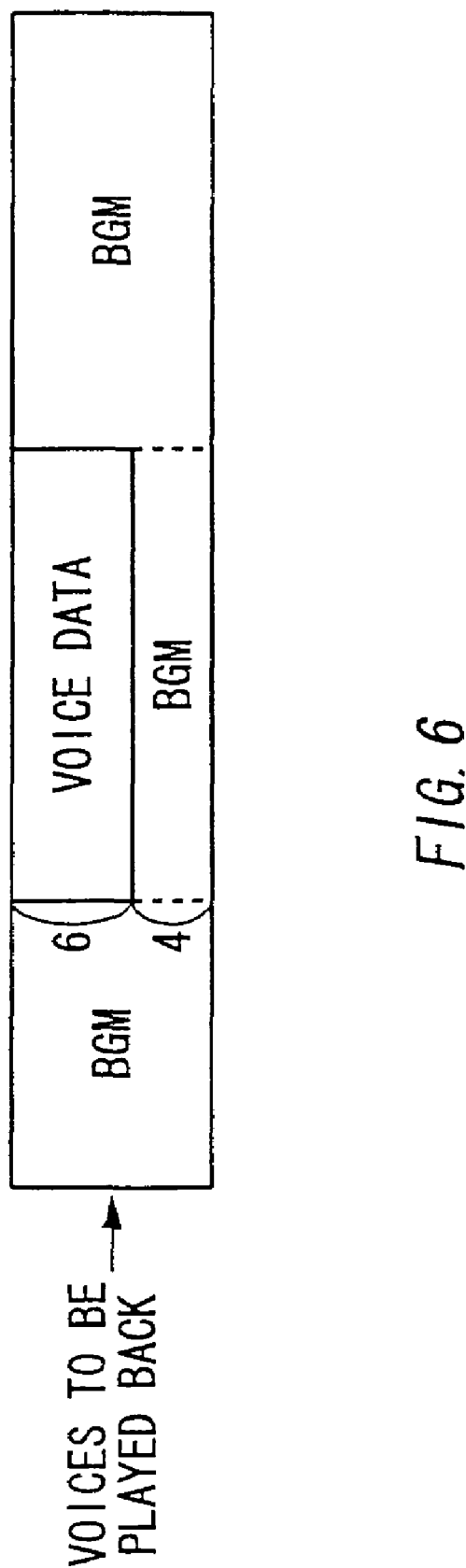
FIG. 6 is a diagram showing an exemplary manner of mixing voice data and background music for playing back backup-tuned mixed images of both still and moving pictures.

FIG. 6 is a diagram showing an exemplary manner of mixing voice data and background music for playing back backup-tuned mixed images of both still and moving pictures. When playing back separately-prepared music data (background music) along with mixed images, the image playback part in the mixed images plays only the background music as a voice. On the other hand, the movie playback part in the mixed images plays mixed data of both voice data included in movies and the background music as a voice. FIG. 6 shows the case of playing back both the voice data included in movies and the background music by mixing them in the proportion of six parts to four.

Figure 7:
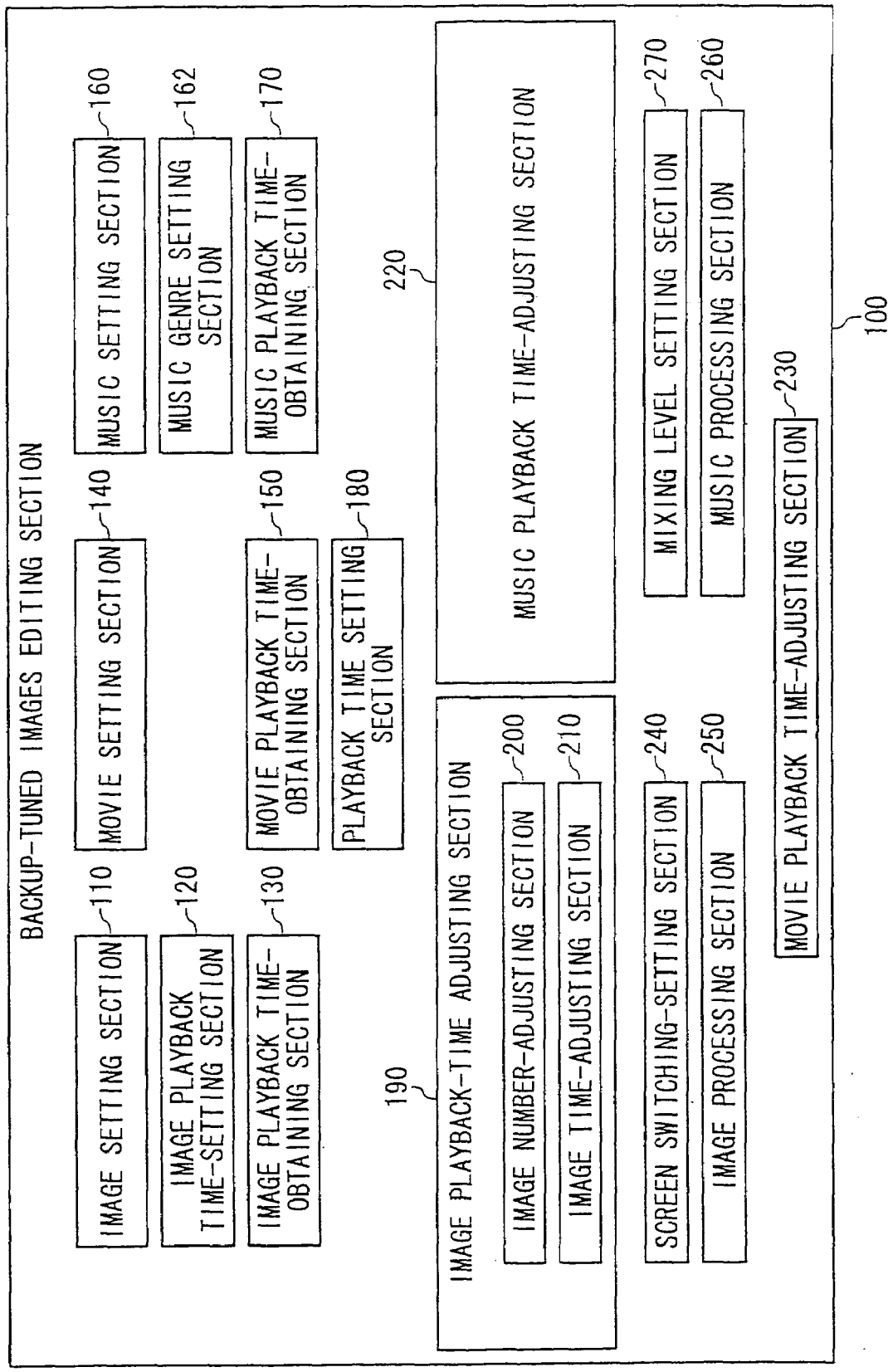
FIG. 7 is a structural diagram of a backup-tuned images editing section.

FIG. 7 is a structural diagram of the backup-tuned images editing section 100. The backup-tuned images editing section 100 edits backup-tuned images and backup-tuned movies. The backup-tuned images editing section 100 makes an adjustment of the image playback time, the movie playback time, and the music playback time according to need. The backup-tuned images editing section 100 also heightens an effect of the playback of, for example, backup-tuned images by setting the timing of switching images, processing displays of switching images, and processing the introductory part and the ending part of playing music.

The details of each functional structure in FIG. 7 are described in the following. The image setting section 110 displays on the LCD monitor images stored in a memory and the list of the images capable of being transferred from a personal computer and played back. The user selects images for setting as images from among the displayed images. The image playback time-setting section 120 accepts a setting of playback time for each set image. The image playback time-obtaining section 130 obtains an image playback time by calculating the sum of the playback time of each selected image when the selection of images and the image playback time are made.

On the other hand, the music setting section 160 displays on the LCD monitor the music stored in a memory and the list of music capable of transferring from a personal computer and playing back. When music is selected, the music playback time-obtaining section 170 obtains the music playback time of the set music.

The music genre setting section 162 sets the genre of music to be played back. The music genre setting section 162 previously prepares a music genre, such as classics and rock. The user sets a music genre suited to the atmosphere of the playing images from among prepared music genres. In this case, the music setting section 160 may automatically set a random number (title of music) from among the set music genres. Thus, the user can play back music that matches with playing images without setting the title of playing music. The user may also select numbers from among the set music genres.

The playback time setting section 180 sets the playback time of the backup-tuned images as the image playback time or the music playback time, which is obtained based on each image playback time, after the image, each image playback time, and music are temporarily set. The user may decide which playback time to set. The user may also set the playback time by himself/herself.

The image playback time-adjusting section 190 makes an adjustment of the image playback time according to need. The adjustment of the image playback time is made by increasing or decreasing the number of playing images by the image number-adjusting section 200, by increasing or decreasing the playback time of each image, and by increasing or decreasing both the number of images and the playback time of each image.

The music playback time-adjusting section 220 adjusts by increasing or decreasing the music playback time according to need. When shortening the music playback time, cutting of the introductory part or the ending part of the music is undertaken. When prolonging the music playback time, the music is continuously played back or other music is sequentially played.

The details of functional structures relating to the editing of backup-tuned movies in FIG. 7 are described in the following.

The movie setting section 140 displays on the LCD monitor movies stored in a memory and the list of the movies capable of being transferred from a personal computer and played back. The user selects movies for playing from among the displayed listed movies. The movie playback time-obtaining section 150 obtains a movie playback time of the selected movies when the selection of movies are made.

The music setting section 160 sets music and the music playback time-obtaining section 170 obtains the music playback time, in the same way as the backup-tuned images, with respect to the music used in backup-tuned movies.

The playback time setting section 180 sets a playback time of backup-tuned movies. There are cases when the movie playback time is the basis, when the music playback time is the basis, and the time set by the user is the basis, for the backup-tuned movie playback time.

The movie playback time-adjusting section 230 adjusts the time by increasing or decreasing the movie playback time when the movie playback time and the backup-tuned movie playback time do not coincide with each other. For example, when decreasing the movie playback time, the required time for cutting is displayed to the user. The user cuts the movie parts of the corresponding time.

On the other hand, the music playback time-adjusting section 220 adjusts the time by increasing or decreasing the music playback time when the music playback time and the backup-tuned movies playback time do not coincide with each other.

For playing back a voice of backup-tuned movies, the music processing section 260 mixes the voice included in movie data and separately-prepared music. This is the function for playing back separately-prepared music along with the voice recorded in movies. In the mixing, volume adjustments of both the voice in the movies and music are made in order to play back the voice and music without a sense of discomfort. The mixing level setting section 270 undertakes these adjustments. The mixing level setting section 270 also mixes the voice included in movies in mixed images and separately-prepared background music.

The backup-tuned image-editing section 100 may edit backup-tuned images in order to make the image playback time and the music playback time of backup-tuned images, the movie playback time and the music playback time of backup-tuned movies, and the mixed image playback time and the music playback time of backup-tuned mixed images, respectively coincide with each other. For example, the backup-tuned image-editing section 100 may edit backup-tuned images in order to make the difference between the image playback time and the music playback time be within a predetermined allowable range. The user may designate the allowable range of the difference between the image playback time and the music playback time.

The above is a description of functional structures for adjusting playback times of backup-tuned images and backup-tuned movies. The following description is about functional structures for making it possible for users to listen and watch backup-tuned images more naturally.

Figure 8:
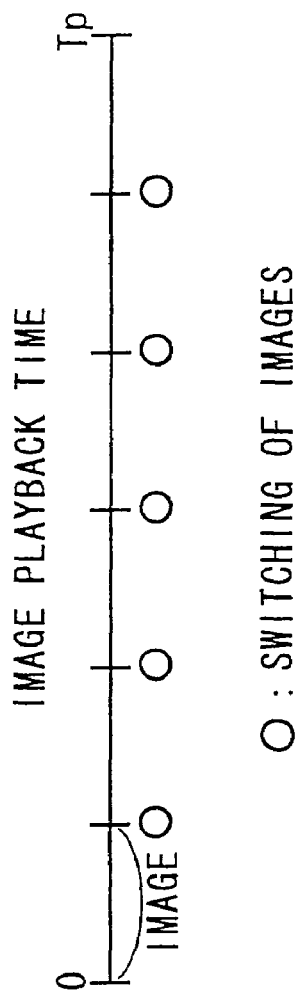
FIG. 8 illustrates an exemplary diagram showing a switching manner of images synchronized with sub-sections.
Figure 8:
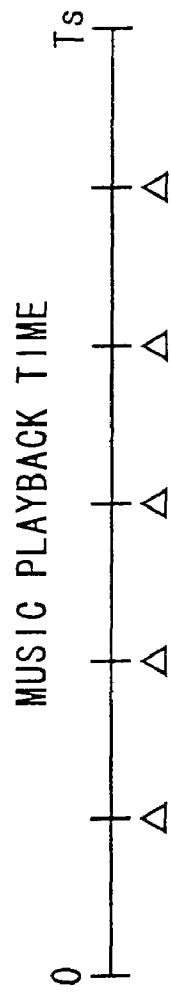
Figure 9:
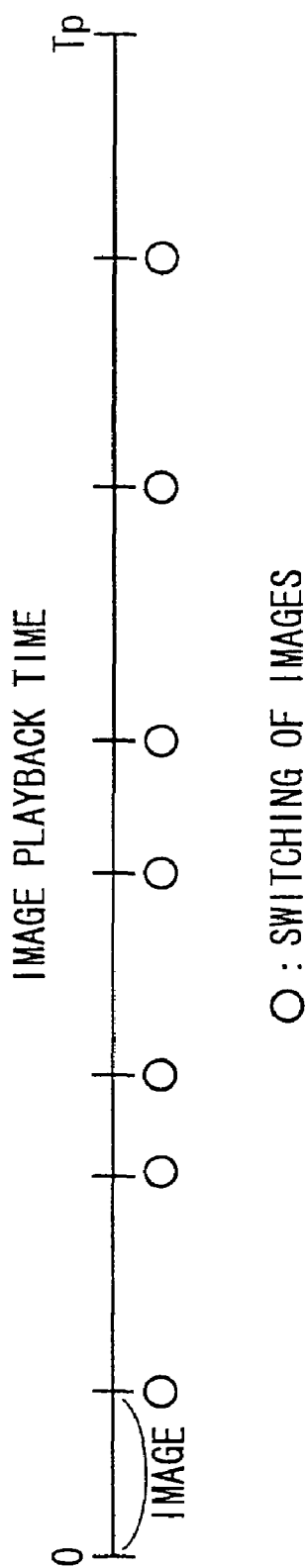
FIG. 9 illustrates an exemplary diagram showing a switching manner of images synchronized with a distinctive sound.
Figure 9:
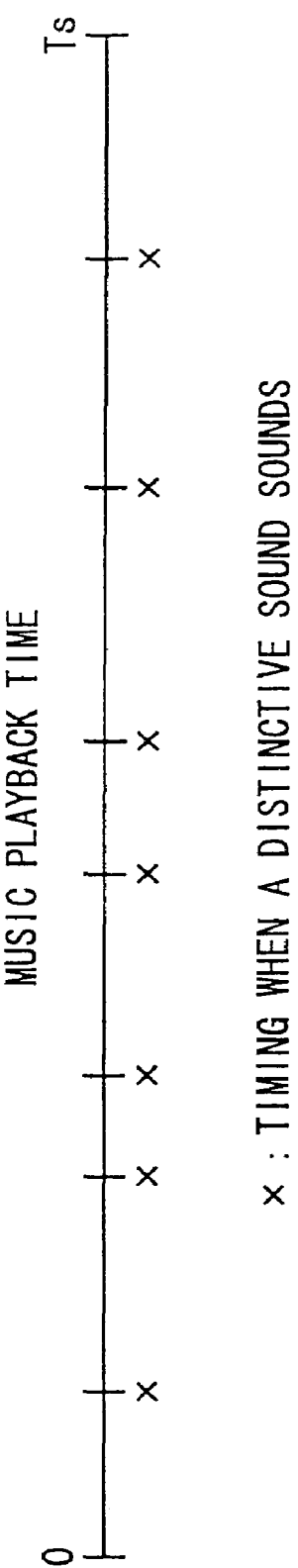

The screen switching-setting section 240 switches images in accordance with a specific timing of music. Here, the specific timing of music means, for example, timing at the beginning of a sub-section of music and at which more than a certain level of volume sounds in the music. FIGS. 8 and 9 describe this timing of switching.

FIG. 8 illustrates an exemplary diagram showing a switching manner of images synchronized with sub-sections. A triangle mark shows the timing of the beginning of a sub-section of music. A circle mark shows the timing of switching images. The timing of switching images (the circle mark) is set in order to coincide with the beginning of a sub-section of music (the triangle mark). Thus, images and music are played back naturally without a sense of discomfort since images are played back in a manner that matches with the progress of the music.

FIG. 9 illustrates an exemplary diagram showing a switching manner of images synchronized with a distinctive sound. A cross mark shows the timing of the distinctive sound to sound in music. Here, the distinctive sound means the sound of a certain instrument. The detection of the distinctive sound is made by retrieving the distinctive sound from the music based on the playback frequency profile that is distinctive to the instrument. A circle mark shows the timing of switching images. In this case, the switching of images coincides with the timing of the sound of the distinctive sound. In FIG. 9, the timing of the circle mark and the cross mark are the same.

As an example of switching images in accordance with a distinctive sound, a sound of a drum may be set as the distinctive sound. In this case, the user can play back backup-tuned images whose images and music are closer matched with each other since the images are switched along with the sound of a drum thereby images may be switched simultaneously to the rhythm of sound.

When setting the switching of images like this, the number of images may sometimes fall short. In this case, the user sets images to be played back, by using the image setting section 110. When images are left, the number of remaining images is shown to the user. The user then deletes the remaining images.

Referring back to FIG. 7, the remaining functional structures are described in the following.

The image processing section 250 sets a display processing of switching images when sequentially displaying the images. One of the switching manner of images is, for example, an ordinary processing to instantaneously switch the display of an image B after displaying an image A. Otherwise, there are "spin door," "slide," and "box" as switch processing of images.

Figure 10A:
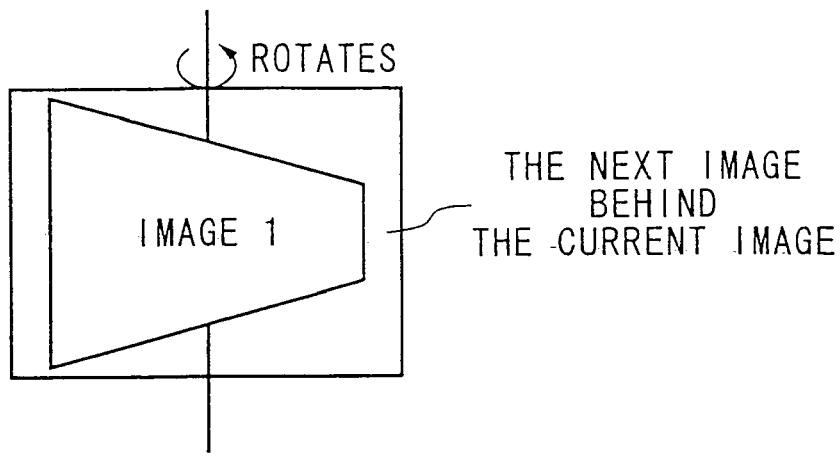
FIGS. 10A, 10B, and 10C are diagrams showing switch processing of images.
Figure 10B:
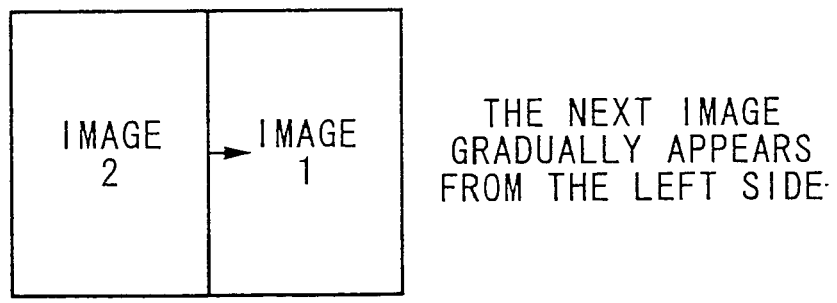
Figure 10C:
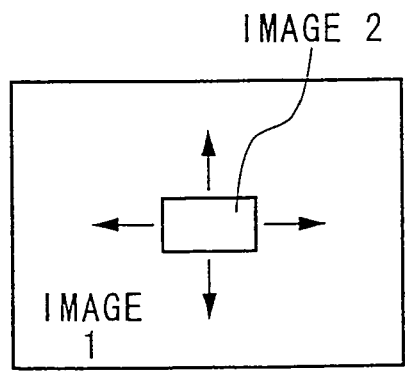

FIGS. 10A, 10B, and 10C are diagrams showing switch processing of images. The "spin door" is a method where by a playing image rotates and displays the next image after the playing image is reversed. The "slide" is a method whereby a playing image moves to the right direction as the next playing image gradually appears from the left side. The "box" is a method whereby the next playing image is displayed by gradually increasing in size after appearing at the center of a playing image, as a very small image. The user may select a desired method of processing amongst the above screen switch processing method.

The switch processing of images is set according to the music genre to be played back, which is described later. For example, in a case where the music genre is rock music, the user may feel a sense of speed by the images being instantly switched. If the music genre is classical, images may be smoothly switched in accordance with a tune of music by displaying the image B as gradually brightening up (referred to as "fade-in display" hereinafter) after finishing the display by gradually darkening the image A (referred to as "fade-out display" hereinafter).

The music processing section 260 processes for adjusting the music playback time in order to make music sound natural. When adjusting the music playback time to shorten, it is possible to give the user a brusque impression since the music may start or end suddenly if the playback time is merely shortened. So, the music processing section 260 creates backup-tuned images whose image playback time and music playback time coincide with each other by fading in and/or fading out the beginning part and/or the end part of the music. Thus, the user may listen or watch backup-tuned images without a sense of discomfort.

The backup-tuned images-editing section 100 having the above-described structures may adjust playback times for various combinations of playback images and playback music. The description below is made along with typical examples relating to the adjustments of playback times. In the examples below, the "image processing" includes the display processing of images, such as the "fade-in," the "fade-out," the "spin door" and so forth at the image processing section 250 described above. The "music processing" includes processing such as the "fade-in" when starting playing back music at the music processing section 260.

Figure 11:
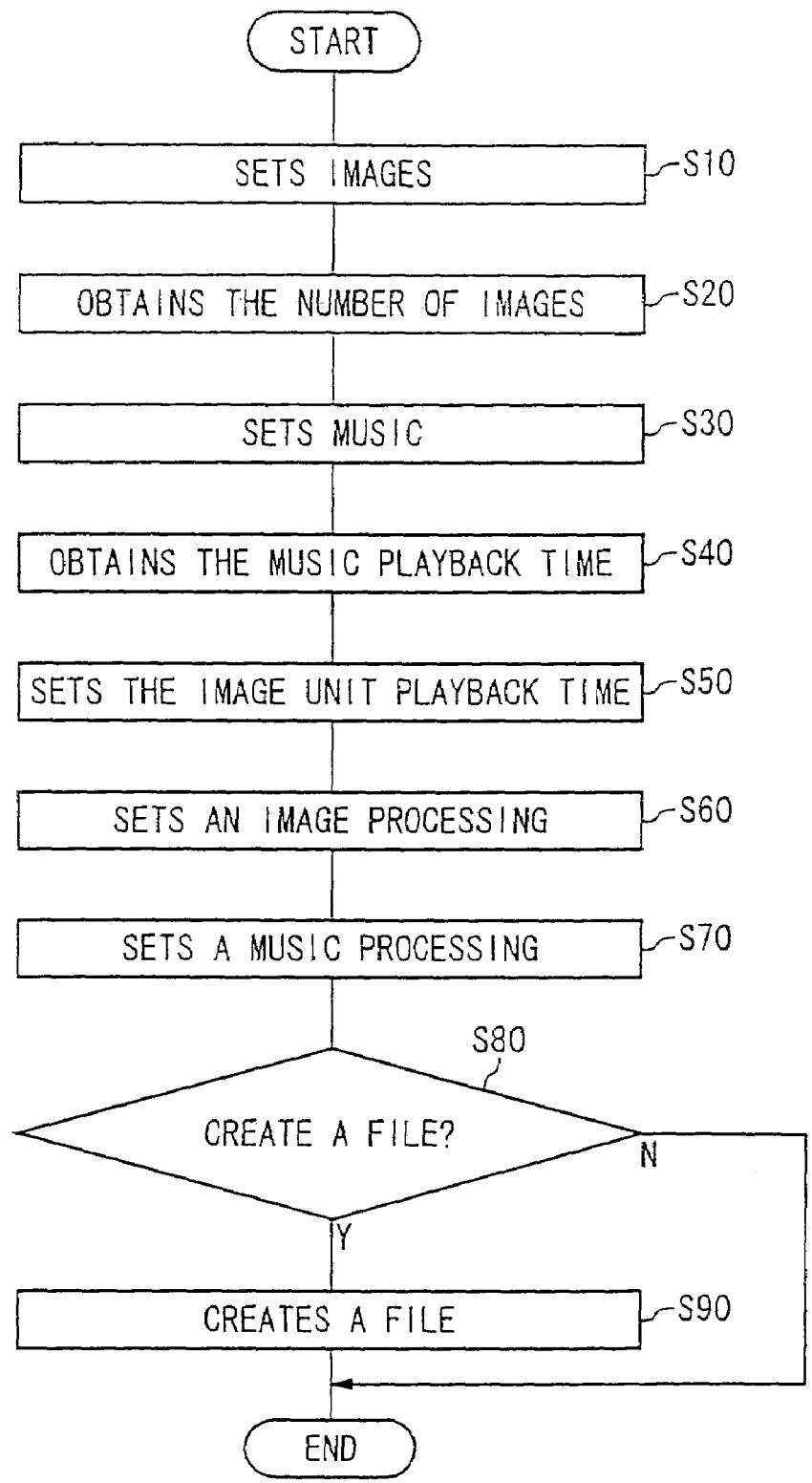
FIG. 11 is a flowchart showing a process, which is taken when an image quantity n and a music playback time Ts are previously set.

If the number of images n and the music playback time Ts are previously set:

FIG. 11 is a flowchart showing this process. In this case, the image setting section 110 sets images to be played back, at S10. The image setting section 110 then obtains the set number of images, at S20. Music is set by the user using the music setting section 160, at S30. The music playback time-obtaining section 170 obtains the music playback time, at S40. The number of images n and the music playback time Ts are fixed. The image time-adjusting section 210 automatically sets the image playback time for each image in order to coincide the image playback time Tp with Ts, at S50. For example, when Ts is five minutes and the number of images n is 10, five minutes is set as the playback time, and the image playback time is adjusted so that the image playback time also becomes five minutes. In this case, the image playback time for one image becomes thirty seconds per image, which is calculated by dividing the five minutes by ten images. Thus, backup-tuned images whose image playback time coincides with the music playback time are created. Subsequently, the user makes an image processing setting of the images included in the created backup-tuned images at S60 and a music processing setting of music included in the created backup-tuned images at S70. Finally, the user decides whether or not to create and store the created backup-tuned images as a file such as an MPEG file, at S80. Then, a necessary file is created according to need, at S90.

Figure 12:
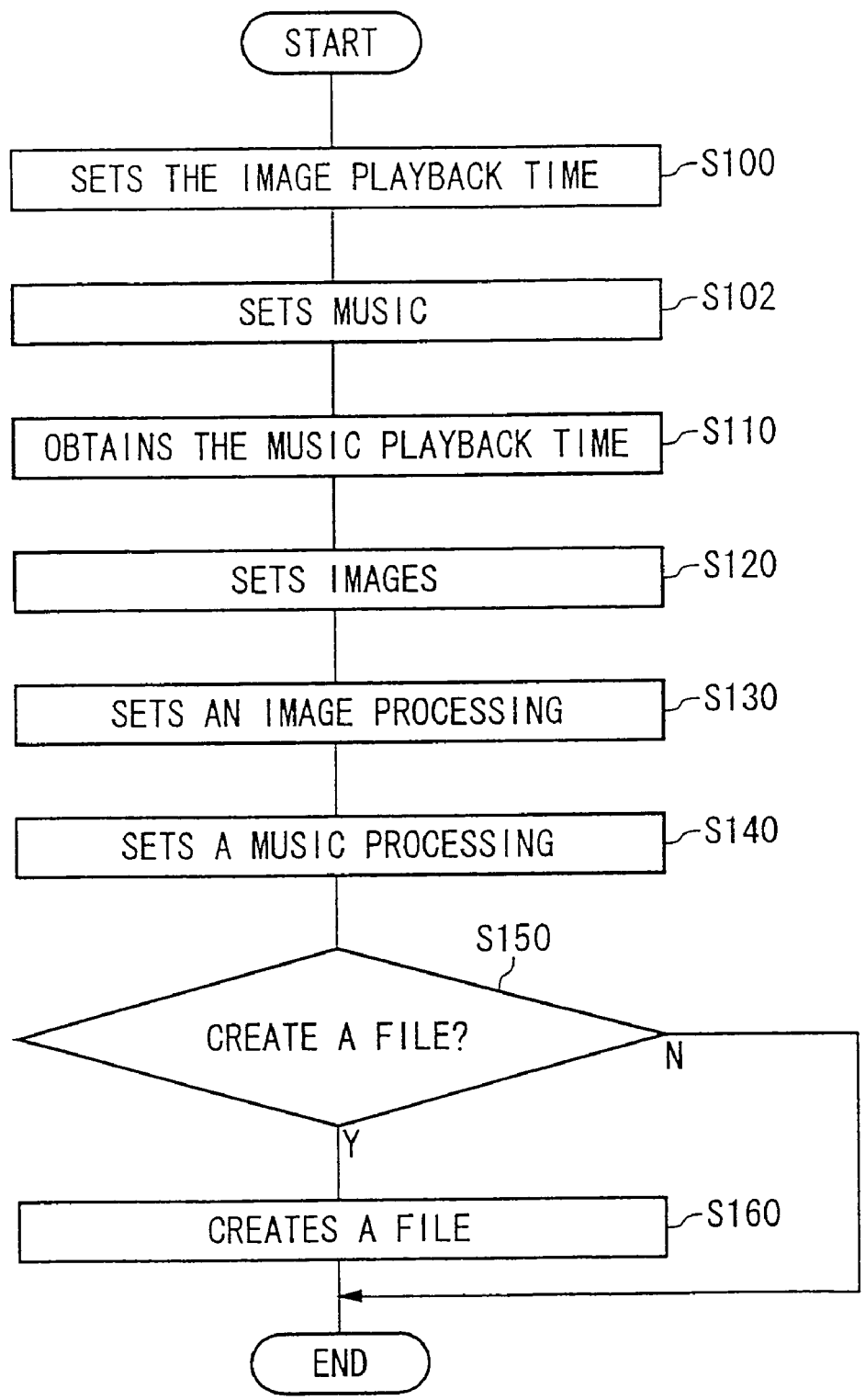
FIG. 12 is a flowchart showing a process, which is taken when an image playback time Pi and a music playback time Ts are previously set.

If the image playback time Pi and the music playback time Ts are previously set:

FIG. 12 is a flowchart showing this process. In this case, the image playback time-setting section 120 firstly sets the image playback time, at S100. The music setting section 160 then sets the music, at S102. The music playback time-obtaining section 170 obtains the music playback time based on the set music, at S110. The number of images n is calculated by the formula n=Ts/Pi. The image setting section 110 randomly retrieves from a memory and the like, images corresponding to the necessary number, at S120. Thus, backup-tuned images whose image playback time and music playback time coincide with each other are created. Subsequently, the user makes an image processing setting of the images included in the created backup-tuned images at S130 and a music processing setting of music included in the created backup-tuned images at S140. Finally, the user decides whether or not to create and store the created backup-tuned images as a file such as an MPEG file, at S150. Then, a necessary file is created according to need, at S160.

Figure 13:
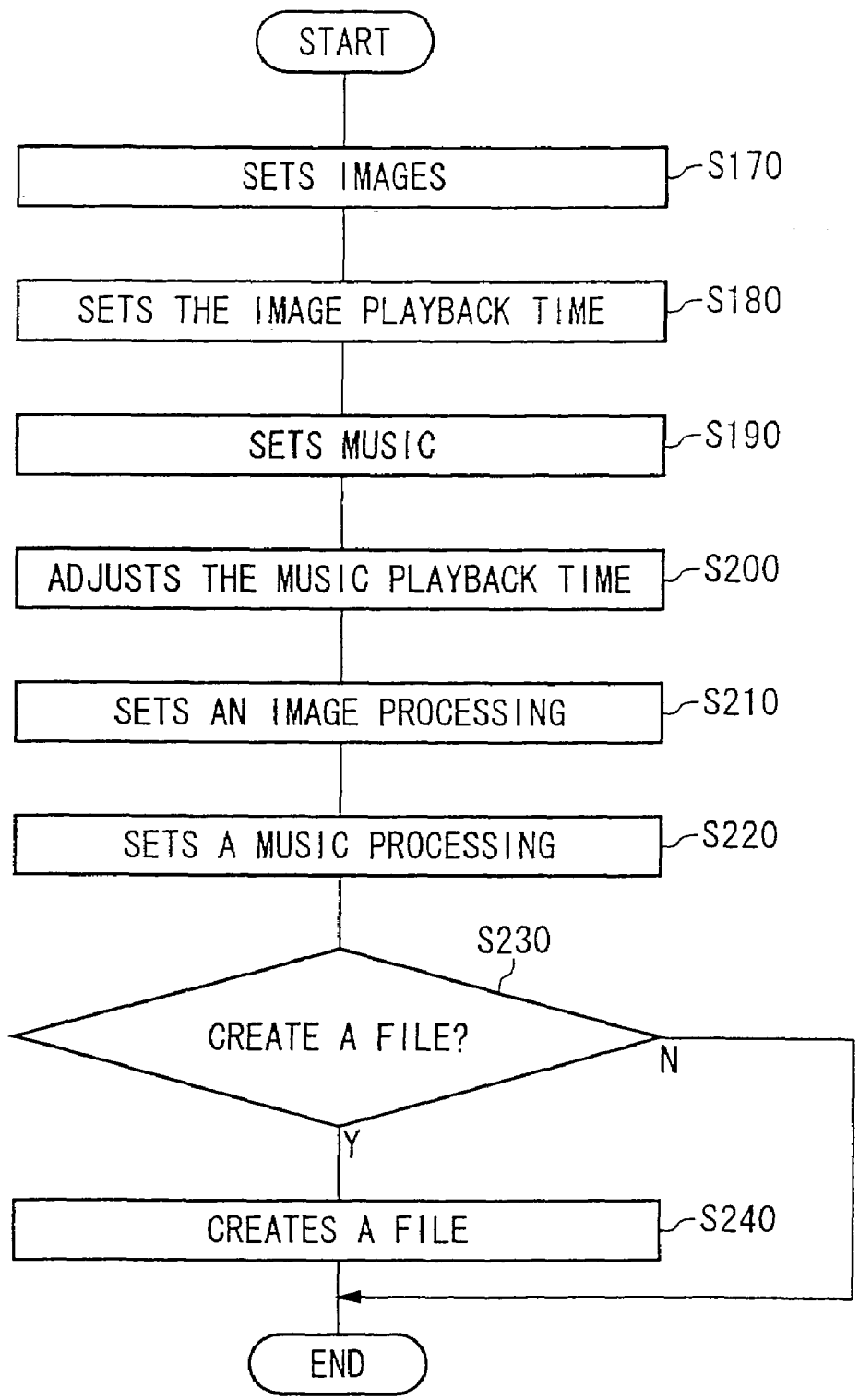
FIG. 13 is a flowchart showing a process, which is taken when an image playback time Pi and an image quantity n are previously set.

If the image playback time Pi and the number of images n are previously set:

FIG. 13 is a flowchart showing this process. In this case, the image setting section firstly sets the playback time for each image, at S170. The image playback time-setting section 120 then sets the playback time for each image, at S180. Then, the image playback time is uniquely decided. What is necessary is music to play back. The image playback time Tp is calculated by the formula Tp=Pi*n. The music setting section 160 automatically selects from a memory and the like, music whose music playback time is close to the image playback time, at S190. However, it is rare to find music having the music playback time Ts that coincides with the image playback time Tp. So, the music playback time-adjusting section 220 makes the music playback time Ts of the set music coincide with the image playback time Tp, at S200. For example, if Ts is longer than Tp, Ts and Tp are coincided by cutting the beginning part and/or the end part of the music. Subsequently, the user makes an image processing setting of the images included in the created backup-tuned images at S210 and a music processing setting of music included in the created backup-tuned images at S220. Finally, the user decides whether or not to create and store the created backup-tuned images as a file such as an MPEG file, at S230. Then, a necessary file is created according to need, at S240.

If there is only music data of Ts<Tp whose music playback time is close to the image playback time, Pi or n may be slightly adjusted.

Figure 14:
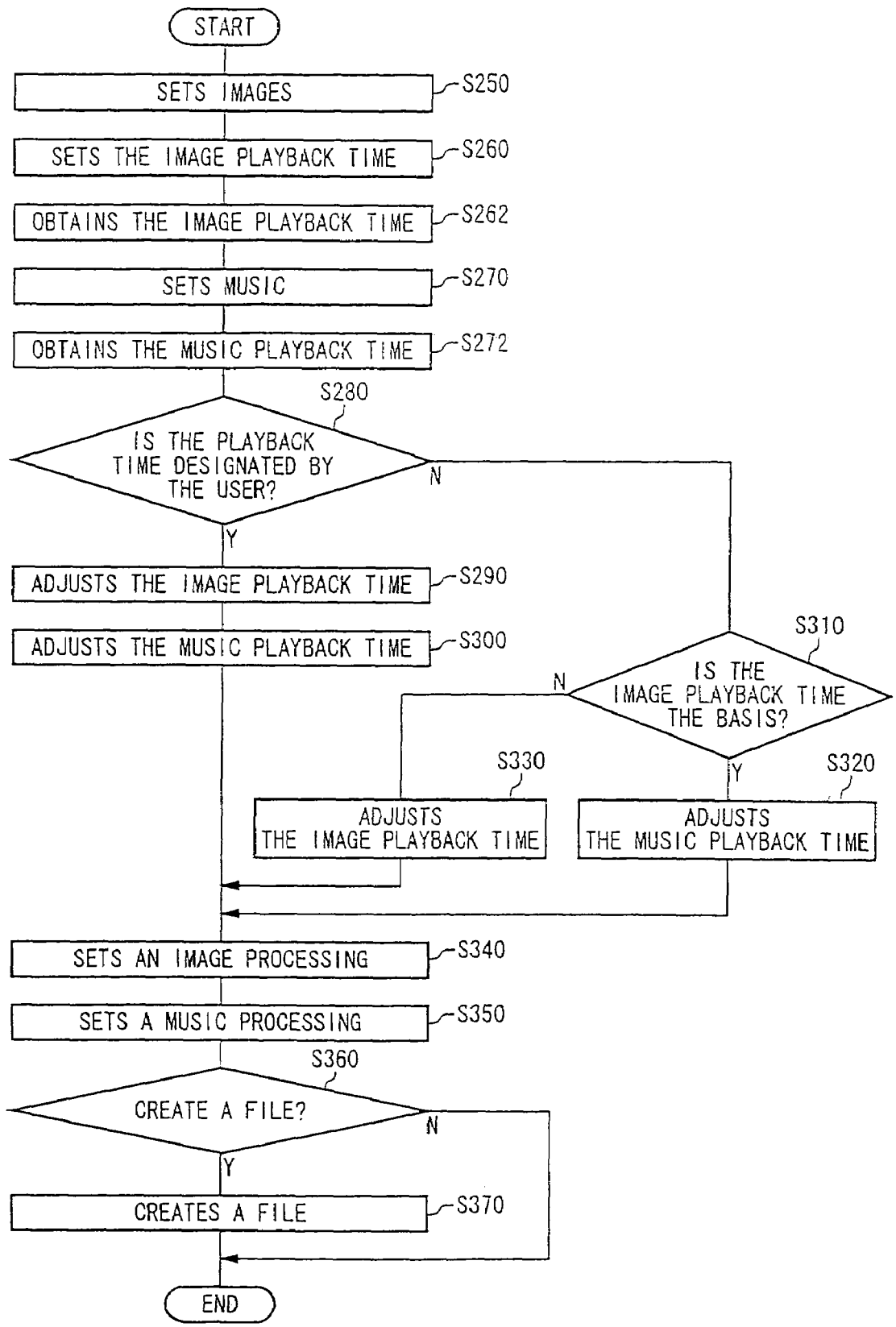
FIG. 14 is a flowchart showing a process, which is taken when images, an image playback time, and music, which are to be played back, are set by a user.

If the images, the image playback time, and music, which are to be played back, are set by the user:

FIG. 14 is a flowchart showing this process. In this case, it can finally be divided into three cases. The first case is a case that the playback time is decided by the user's designation. In this case, the image playback time and the music playback time are coincided with the designated playback time. The second case is a case that the music playback time Ts is adjusted based on the image playback time Tp. In this case, the music playback time is coincided with the image playback time. The third case is a case that the image playback time Tp is adjusted based on the music playback time Ts. In this case, the image playback time is coincided with the music playback time.

These three cases are described according to the flowchart.

The user firstly sets images for playing back using the image setting section 110, at S250. The image playback time-setting section 120 sets the playback time for each image, at S260. The image playback time-obtaining section 130 obtains the image playback time based on the set image playback time, at S262. The music setting section 160 sets music to be played back, at S270. The music playback time-obtaining section 170 obtains the music playback time based on the set music, at S272. Then, the adjustments of the image playback time Tp and the music playback time Ts begin. First, whether the playback time is designated by the user is judged, at S280. If the time is designated (the first case), the image playback time is adjusted in order to coincide with the designated playback time (T), at S290. Since the number of images are already decided, the image playback time Pi is calculated by the formula Pi=T/n. On the other hand, the music playback time Ts is adjusted in order to coincide with the playback time. If this function is used when the user wants to set the playback time to a predetermined time, backup-tuned images that are adjusted to a desired playback time may be easily played back.

If the playback time is not originally designated by the user, whether or not to make the image playback time of the backup-tuned images be based on the image playback time is decided, at S310. If the image playback time is set as the basis (the second case), the music playback time Ts is adjusted based on the image playback time Tp. The music playback time Ts is adjusted in order to coincide with the image playback time Tp, at S320. Thus, the user may play back music suited to the image playback time if the user only decides images, music, and the image playback time for playing back.

At S310, if the image playback time is not set as a basis, the music playback time becomes the basis. In this case (the third case), the image playback time Tp is adjusted based on the music playback time Ts. The image playback time Pi is adjusted according to Ts, at S330. That is, Pi is calculated by the formula Pi=Ts/n. This calculation is convenient when the user wants to make the image playback time coincide with music that the user wants to play back.

Subsequently, the user makes an image processing setting of the images included in the created backup-tuned images at S340 and a music processing setting of music included in the created backup-tuned images at S350. Finally, the user decides whether or not to create and store the created backup-tuned images as a file such as an MPEG file, at S360. Then, a necessary file is created according to need, at S370.

Although the processing of images and music is made after the adjustment of the playback time in the above typical examples, these processings may be undertaken before the adjustment of the playback time.

Figure 15:
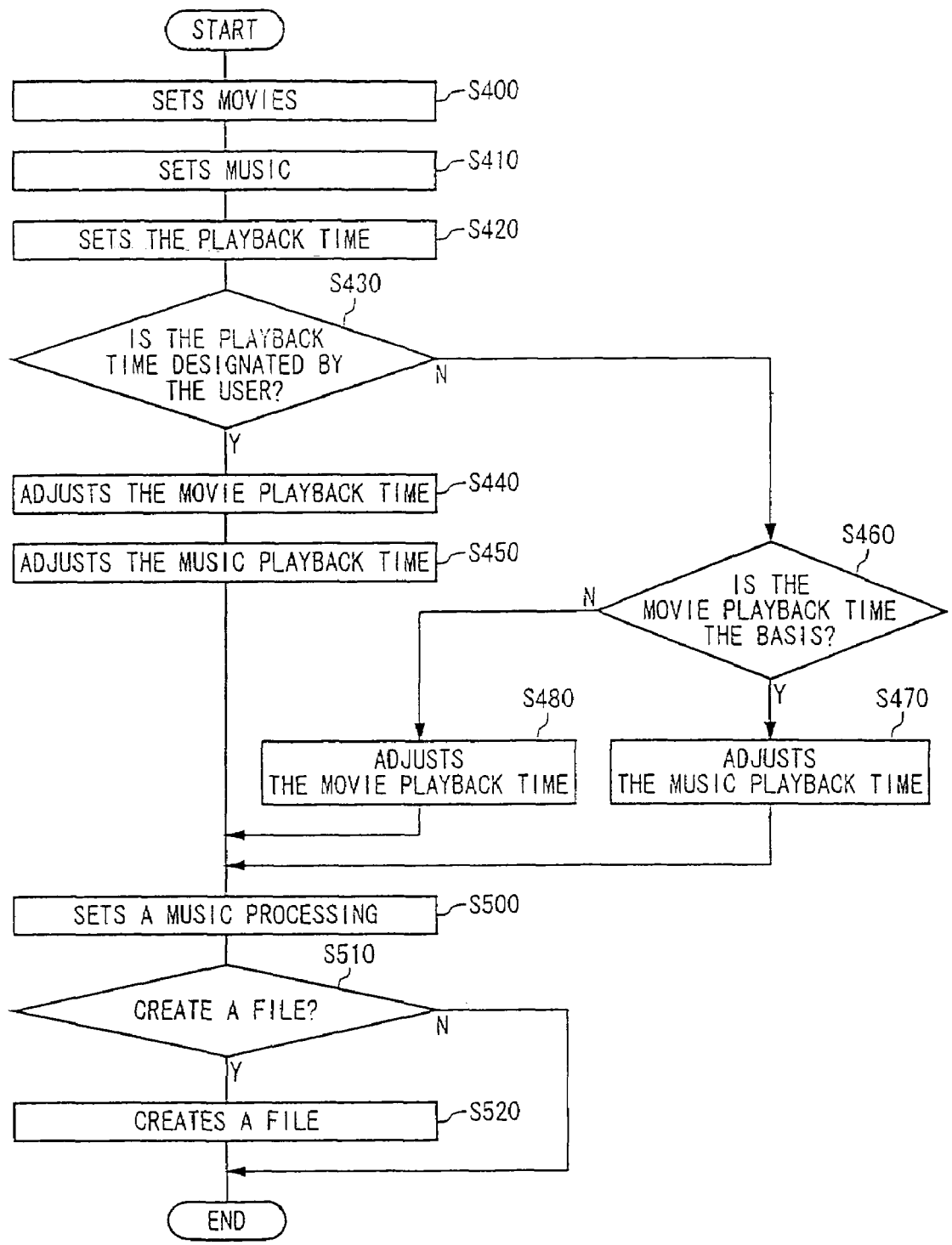
FIG. 15 is a flowchart showing a process when creating a backup-tuned movie.

On the other hand, typical examples in a case of creating backup-tuned images are described in the following. FIG. 15 is a flowchart showing a process when creating a backup-tuned movie. First, the user sets movies using the movie setting section 140, at S400. The user then sets music using the music setting section 160, at S410. The playback time setting section 180 sets a basis value of the playback time of the backup-tuned movies, at S420. Then, whether or not the backup-tuned movies are within the designated time is judged, at S430. If the playback time is designated by the user, the movie playback time-adjusting section 230 adjusts the movie playback time in order to coincide with the set playback time as well as adjusting the music playback time in order to coincide with the set playback time by the music playback time-adjusting section 220.

On the other hand, if the playback time is not designated by the user, whether or not to set the playback time as the movie playback time is judged, at S460. If the movie playback time is set as the playback time, the music playback time-adjusting section 220 adjusts in order to make the music playback time coincide with the movie playback time, at S470.

If the playback time is not set as the movie playback time, the playback time is set as the music playback time. The movie playback time-adjusting section 230 then adjusts the movie playback time in order to coincide with the music playback time, at S480.

Subsequently, the user makes a music processing setting of music included in backup-tuned movies at S500. Here, processing such as mixing of voices included in the movie data and music as background music, and the fade-in and fade-out processing of music, are undertaken according to need. The music processing may be undertaken before the adjustment of the playback time.

Finally, the user decides whether or not to create and store the created backup-tuned images as a file such as an MPEG file, at S510. Then, a necessary file is created according to need, at S520.

The backup-tuned images whose image playback time coincides with the music playback time and the backup-tuned movies whose movie playback time coincides with the music playback time, which are created in the manner described above, may be stored in a memory as a movie file of MPEG format as well as transferring to a personal computer and playing back on the computer.

Figure 16:
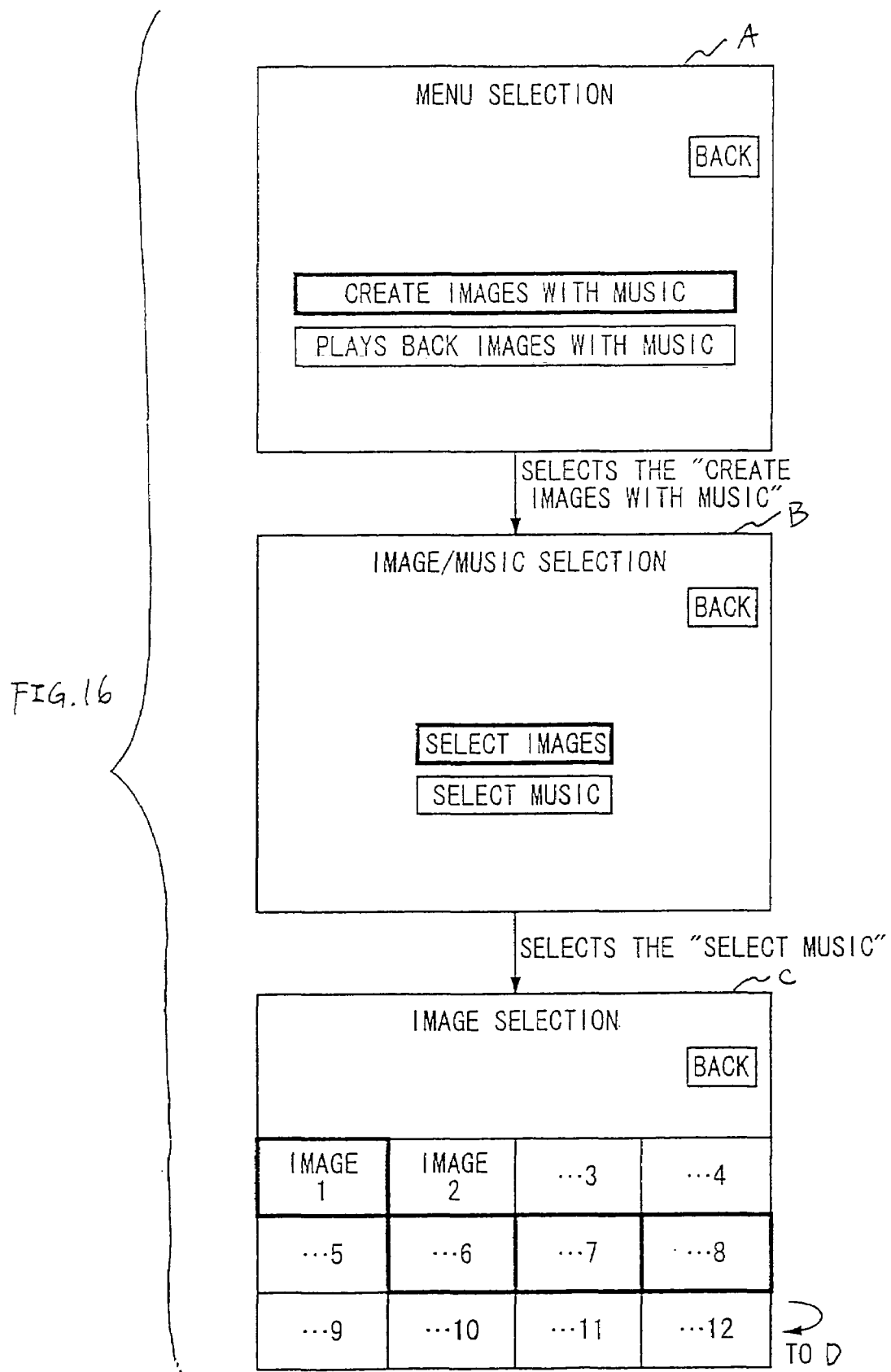
FIG. 16 illustrates a diagram showing screen displays from A to C displayed on an LCD monitor when creating backup-tuned images.
Figure 17:
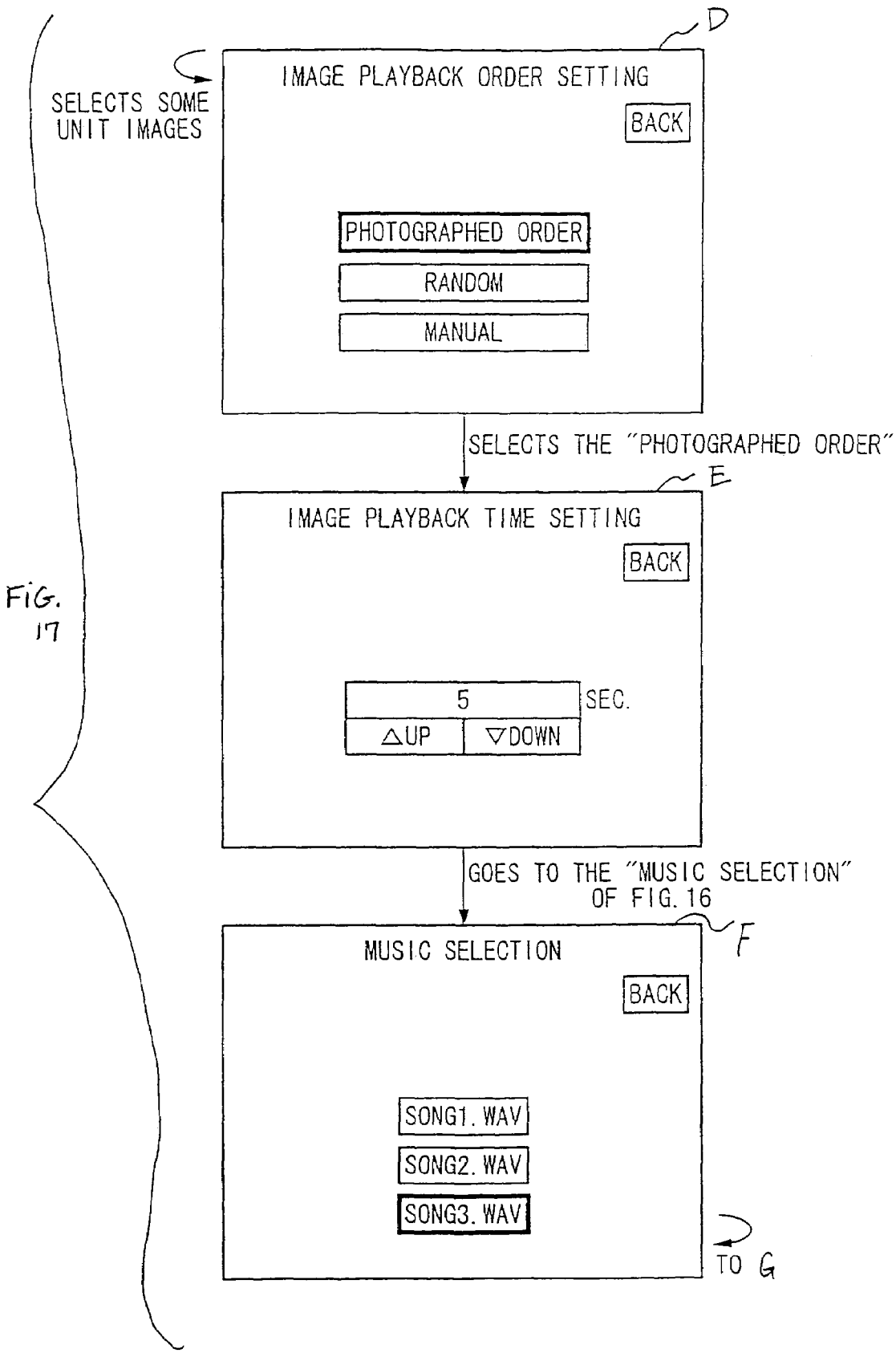
FIG. 17 illustrates a diagram showing screen displays from D to F displayed on an LCD monitor when creating backup-tuned images.
Figure 18:
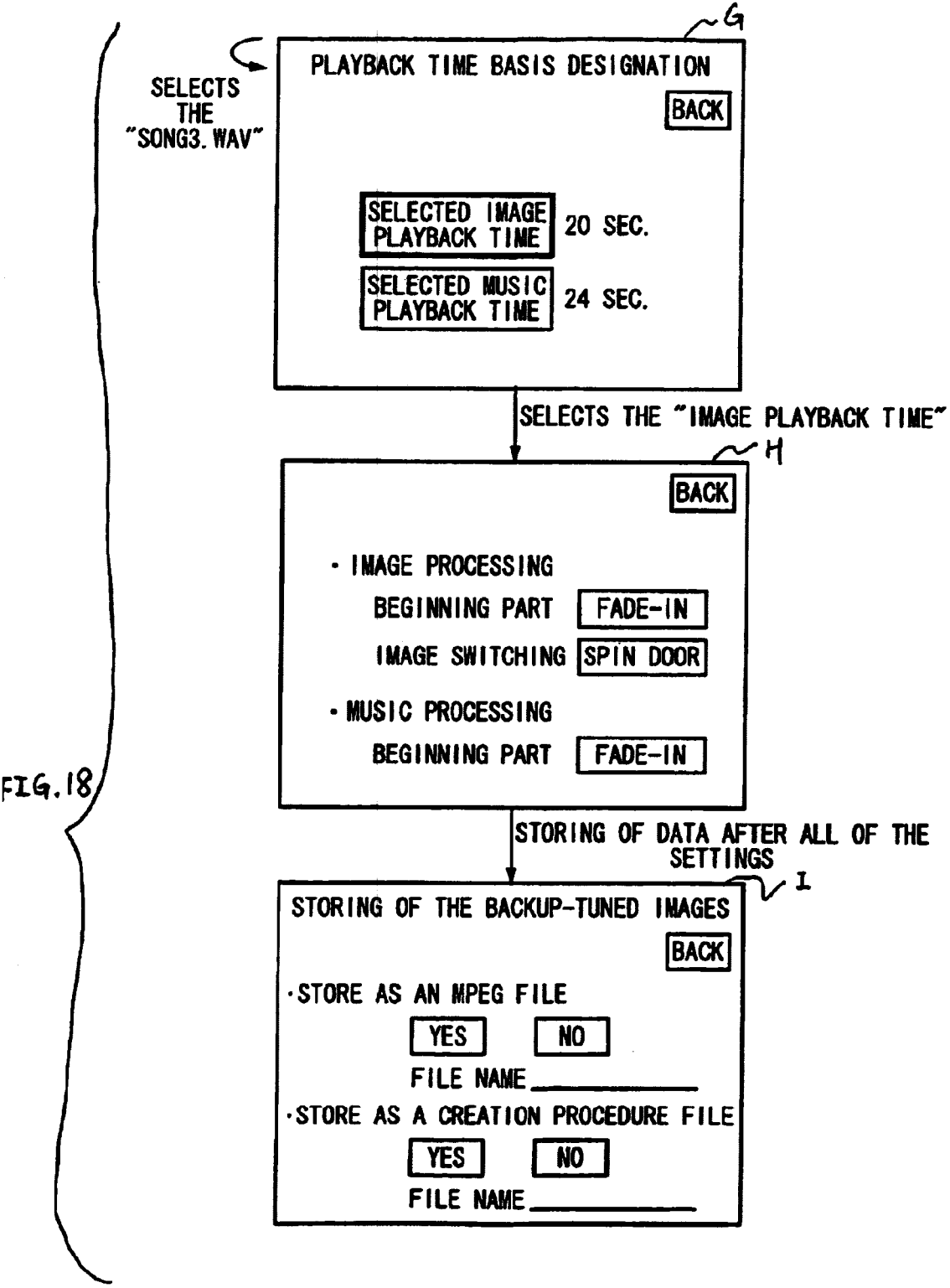
FIG. 18 illustrates a diagram showing screen displays from G to I displayed on an LCD monitor when creating backup-tuned images.

FIGS. 16 to 18 illustrate diagrams showing screen displays displayed on an LCD monitor when creating backup-tuned images. FIGS. 16 to 18 follow the order of displaying display screens shown to the user when the backup-tuned images editing section 100 edits backup-tuned images.

First, the user inputs desired settings using the multi-function operations switch, according to the menu displayed on the LCD monitor. At the menu selection page A, the user selects the "create backup-tuned images." Then, the user selects the "select images" at the image/music selection page B. Then, at the image selection page C, the list of the images stored in a memory and the like is displayed on the LCD monitor. The user selects images that he/she wants to play back. In this case, the user selects images 1, 6, 7, and 8.

Then, the display screen goes on to FIG. 17. At the image playback order-setting page D, the user sets the order of playing back images. For the playback order, there are the order of the photographed date and time, the random order, and the user's manual setting, whereby the user may freely change the order. In this example, the user selects the "photographed order." Then, at the playback time-setting page E, the user sets the playback time of images. In this example, the user sets the image playback time as five seconds. At the music selection page F, the user selects music to be played back along with the selected images. The page F may display several pieces of retrieved music having a close playback time to the image playback time. Here, the user selects the "song3.wav."

After selecting images and music, the page moves to FIG. 18. The playback time basis-designating page G displays scheduled playback time for the respective selected images and music. The user then selects a playback time to be the basis. Here, the user selects the "image playback time." Then, the music playback time is adjusted by, for example, cutting the end part of the music, according to the selected time. At the page H, the images and music are set processing for heightening an image display effect and a music playback effect. Regarding the images, such as the "fade-in" for displaying images by gradually lightening up the images and the "spin door" for switching images are set. Regarding the music, such as the "fade-in" for playing music by gradually turning up the volume is set. Thus, backup-tuned images are simply created by the above-described process. After all of the settings, the user decides whether or not to store the created backup-tuned images in an MPEG file and the like, at the data-storing page I.

The user also decides whether to store data such as the type of the images, the playback order, the image playback time, and the method of processing images, which have been selected so far, as a creation procedure file. By storing this data as the creation procedure file, the later editing will be simple as well as making it possible to create a slide show.

By using the digital camera with a music playback function described above, the user may easily create and enjoy backup-tuned images whose playback times of images and music coincide with each other without a sense of discomfort and whose timing of such as switching images is matched with the music. Moreover, a similar creation maybe done for backup-tuned movies and backup-tuned mixed images. In the case of the backup-tuned movies and the backup-tuned mixed images, the mixing data of voices may be added to the above creation procedure file.

As is obvious from the description above, according to the present invention, a digital camera with a music playback function, which plays back images and music by coinciding the image playback time required for sequentially displaying images with the music playback time, can be provided. Therefore, a user may easily create and enjoy backup-tuned images whose playback times of images and music coincide with each other without a sense of discomfort and whose timing of such as switching images is matched up to the music.

Although the present invention has been described by way of exemplary embodiments, it should be understood that those skilled in the art might make many changes and substitutions without departing from the spirit and the scope of the present invention which is defined only by the appended claims.

What is claimed is:

1. An image and music playback apparatus for playing back images accompanied by music, comprising:
  an image playback module for playing back a plurality of images accompanied by music prepared separately from said plurality of images in a first playback time;
  a music playback module for playing back said music in a second playback time; and
  an editing section connected to said image playback module and said music playback module for making a period of said first playback time substantially coincide with a period of said second playback time, said editing section defining said first playback time based on the number of said images and on a playback time for each of said plurality of images, when sequentially playing back said plurality of images, said editing section achieving backup-tuned images with coinciding image playback and music playback times,
  wherein said editing section includes a screen switching-setting section for retrieving one or more specific timings of said music and switching images by synchronizing with at least one of said specific timings of said music.

2. The apparatus as claimed in claim 1, wherein said editing section comprises:
an image setting section for selecting said images; and
a music setting section for selecting said music,
wherein said editing section adjusts an image playback time to make said image playback time and said music playback time substantially coincide, based on said number of said images and said music playback time of said music.

3. The as claimed in claim 1, wherein said editing section comprises:
an image playback time-setting section for setting said playback time of each of said images; and
a music setting section for selecting said music,
wherein said editing section adjusts said number of said images to make said image playback time and said music playback time substantially coincide, based on said playback time of each of said images and said music playback time of said music.

4. The apparatus as claimed in claim 1, wherein said editing section comprises:
an image setting section for setting said number of said images; and
an image playback time-setting section for setting said playback time of each of said images,
wherein said music, which is adjusted so that said image playback time and said music playback time substantially coincide, is edited, based on said number of said images and said playback time of each of said images.

5. The apparatus as claimed in claim 1, wherein said editing section comprises an adjustment section for adjusting said image playback time to substantially coincide with said music playback time, when said image playback time and said music playback time are not substantially the same.

6. The apparatus as claimed in claim 5, wherein:
said adjustment section includes an image playback time-adjusting section for adjusting said image playback time;
said image playback time-adjusting section includes:
an image number-adjusting section for setting said number of said images; and
an image time-adjusting section for setting said playback time of each of said images,
wherein said image playback time-adjusting section adjusts said image playback time to substantially coincide with said music playback time, based on said image number-adjusting section and said image time-adjusting section.

7. The apparatus as claimed in claim 5, wherein:
said adjustment section includes a music playback time-adjusting section for adjusting said music playback time; and
said music playback time-adjusting section adjusts said music playback time to substantially coincide with said image playback time.

8. The apparatus as claimed in claim 1, wherein said editing section comprises:
a playback time setting section for setting a time defined by a user as playback time of said images;
an image playback time-adjusting section for adjusting said image playback time to substantially coincide with said playback time defined by the user; and a music playback time-adjusting section for adjusting said music playback time to substantially coincide with said playback time defined by the user.

9. The apparatus as claimed in claim 1, wherein an image file is created having said music playback time and said image playback time that substantially coincide.

10. The apparatus as claimed in claim 1, further comprising:
a movie playback module,
wherein movies are played back having movie playback time that substantially coincides with said music playback time of said music, said music being separate from said movies and played back to accompany said movies.

11. The apparatus as claimed in claim 1, wherein said editing section comprises a screen switching-setting section for setting said playback time of each of said images by synchronizing timing for switching images with a specific timing of said music.

12. The apparatus as claimed in claim 11, wherein said specific timing of said music is at least one of a beginning of each sub-section of said music and a distinctive sound.

13. The apparatus as claimed in claim 1, wherein said editing section comprises an image processing section for setting a process of image switching for each genre of said music.

14. The apparatus as claimed in claim 1, further comprising:
a movie playback module,
wherein movies and said images are played back such that a total playback time for playing back said plurality of images along with said movies substantially coincides with said music playback time, said music being separate from said movies and played back to accompany said movies and said images.

15. The apparatus as claimed in claim 14, wherein creation information of at least one of said images and said movies is outputted to a file.

16. The image and music playback apparatus as claimed in claim 1, wherein said editing section includes:
an adjustment section having at least one of:
an image number-adjusting section for adjusting a number of images to be played back; and
an image time-adjusting section for adjusting a time for playing back an image.

17. The image and music playback apparatus as claimed in claim 16, wherein said editing section comprises:
an image processing section connected to said adjustment section, said image processing section processing said images in concert with said music to be played back; and
a music processing section connected to said adjustment section, said music processing section processing said music in concert with said images to be played back.

18. An apparatus as claimed in claim 1, wherein said editing section determines said playback time of each image based on said second playback time and the number of said plurality of images.

19. An apparatus as claimed in claim 18, wherein said editing section includes an image time-adjusting section for setting said playback time for each of said plurality of images based on a distinctive sound in said music.

20. An apparatus as claimed in claim 18, wherein said editing section includes an image time-adjusting section for setting said playback time for each of said plurality of images based on a sub-section of said music.

21. The apparatus as claimed in claim 1, wherein
when said setting step sets total playback time based on a previously designated total playback time, said adjusting step adjusts music playback time and the image playback time based on said total playback time,
when total playback time is not previously designated and image playback time per image is set, said adjusting step adjusts music playback time so that the music playback time substantially coincides with total image playback time, and
when total playback time is not previously designated and image playback time per image is not set, said adjusting step adjusts playback time per image so that total image playback time substantially coincides with music playback time.

22. The apparatus as claimed in claim 1, further comprising:
a display outputting a display screen menu used to receive user instructions for selecting images and music to be played back.

23. The apparatus as claimed in claim 1, wherein said apparatus is a digital camera.

24. The apparatus as claimed in claim 1, wherein said at least one specific timing of said music comprises a specific timing of a distinctive sound of said music.

25. A method for adjusting an image playback time of a plurality of images and a music playback time of accompanying music to substantially coincide, the method comprising:
(a) accepting input of instructions for selecting images and music to be played back;
(b) setting at least one of images to be played back, an image playback time for playing back said images, music to be played back, movies to be played back, a total playback time, a music genre, a screen switching method, and a mixing level, wherein said music is prepared separately from said images;
(c) obtaining at least one of said image playback time and said music playback time from said setting of said images and said setting of said music;
(d) adjusting at least one of said obtained image playback time and said obtained music playback time to make a period of a first playback time, which is the playback time for the images, substantially coincide with a period of a second playback time, which is the playback time for said music, wherein said first playback time is defined based on the number of said images and on a playback time for each of said plurality of images, said adjusting step achieving backup-tuned images with coinciding image playback and music playback times; and
(e) processing at least one of the images and the music after said adjusting of at least one of said obtained image playback time and said obtained music playback time,
wherein said adjustment step includes the step of retrieving one or more specific timings of said music and switching images by synchronizing with at least one of said specific timings of said music.

26. A method as claimed in claim 25, wherein playback time of each image is determined based on said second playback time and the number of said plurality of images.

27. A method as claimed in claim 26, wherein a playback time of each of said plurality images is set based on a distinctive sound in said music.

28. A method as claimed in claim 26, wherein a playback time for each of said plurality of images is set based on a sub-section of said music.

29. The method as claimed in claim 25, wherein said setting step sets a number of images to be played back and a playback time per image and said adjusting step adjusts said obtained music playback time so that the music playback time substantially coincides with total image playback time.

30. The method as claimed in claim 25, wherein
when said setting step sets total playback time based on a previously designated total playback time, said adjusting step adjusts music playback time and the image playback time based on said total playback time,
when total playback time is not previously designated and image playback time per image is set, said adjusting step adjusts music playback time so that the music playback time substantially coincides with total image playback time, and
when total playback time is not previously designated and image playback time per image is not set, said adjusting step adjusts playback time per image so that total image playback time substantially coincides with music playback time.

31. The method as claimed in claim 25, wherein a user inputs instructions for selecting images and music to be played back using a display screen menu.

32. The method as claimed in claim 25, wherein said method is performed by a digital camera.

33. The method as claimed in claim 25, wherein said at least one specific timing of said music comprises a specific timing of a distinctive sound of said music.

34. A method of making a movie playback time and a music playback time substantially coincide, comprising:
(a) accepting input of instructions for selecting a movie and music to be played back;
(b) setting a movie to be played back and music to be played back based on said instructions;
(c) obtaining at least one of a movie playback time and a music playback time based on said setting step;
(d) adjusting at least one of said obtained movie playback time and said obtained music playback time to make a period of a first playback time, which is a playback time for the movie, substantially coincide with a period of a second playback time, which is a playback time for said music, said adjusting step achieving a backup-tuned movie with coinciding movie playback and music playback times; and
(e) processing said music after said adjusting of said at least one of said obtained movie playback time and said obtained music playback time, wherein
when total playback time is not previously designated and movie playback time is chosen as a basis for adjustment, said adjusting step adjusts music playback time so that the music playback time substantially coincides with the movie playback time, and
when total playback time is not previously designated and movie playback time is not chosen as a basis for adjustment, said adjusting step adjusts movie playback time so that movie playback time substantially coincides with the music playback time; and
wherein said processing step includes the step of mixing voice included in movie data and separately-prepared music.

35. The method as claimed in claim 34, wherein a user inputs instructions for selecting a movie and music to be played back using a display screen menu.

36. The method as claimed in claim 34, wherein said method is performed by a digital camera.

37. The method as claimed in claim 34, wherein said processing step further comprises adjusting a mixing level of the voice included in movie data and the separately-prepared music in a desired proportion.

38. The method as claimed in claim 37, wherein said proportion comprises six parts to four.

39. A movie and music playback apparatus for playing back movies accompanied by music, comprising:
   a movie playback module for playing back a movie accompanied by music prepared separately from said movie in a first playback time;
   a music playback module for playing back said music in a second playback time; and
   an editing section connected to said image playback module and said music playback module, said editing section making a period of said first playback time substantially coincide with a period of said second playback time by:
   (a) accepting input of instructions for selecting a movie and music to be played back;
   (b) setting a movie to be played back and music to be played back based on said instructions;
   (c) obtaining at least one of a movie playback time and a music playback time based on said setting step;
   (d) adjusting at least one of said obtained movie playback time and said obtained music playback time to make a period of the first playback time substantially coincide with a period of the second playback time, said adjusting step achieving a backup-tuned movie with coinciding movie playback and music playback times; and
   (e) processing said music after said adjusting, wherein
   when total playback time is not previously designated and movie playback time is chosen as a basis for adjustment, said editing section adjusts music playback time so that the music playback time substantially coincides with the movie playback time, and
   when total playback time is not previously designated and movie playback time is not chosen as a basis for adjustment, said editing section adjusts movie playback time so that movie playback time substantially coincides with the music playback time; and
   wherein said editing section further comprises a music processing section which mixes voice included in movie data and separately-prepared music.

40. The apparatus as claimed in claim 39, further comprising:
   a display outputting a display screen menu used to receive user instructions for selecting a movie and music to be played back.

41. The apparatus as claimed in claim 39, wherein said apparatus is a digital camera.

42. The apparatus as claimed in claim 39, wherein said wherein said editing section further comprises a mixing level setting section which adjusts a mixing level of the voice included in movie data and the separately-prepared music in a desired proportion.

43. The apparatus as claimed in claim 42, wherein said proportion comprises six parts to four.

\* \* \* \* \*